US007463620B2

(12) United States Patent
Wang et al.

(10) Patent No.: US 7,463,620 B2
(45) Date of Patent: Dec. 9, 2008

(54) ARCHITECTURE AND METHOD FOR CONTROLLING FEATURES AND SERVICES IN PACKET-BASED NETWORKS

(75) Inventors: Guanglu Wang, Buffalo Grove, IL (US);
Michael Homeier, Elmhurst, IL (US);
Anoop Tripathi, Lake Zurich, IL (US)

(73) Assignee: 3Com Corporation, Marlborough, MA (US)

( * ) Notice: Subject to any disclaimer, the term of this patent is extended or adjusted under 35 U.S.C. 154(b) by 1175 days.

(21) Appl. No.: 10/243,642

(22) Filed: Sep. 10, 2002

(65) Prior Publication Data

US 2004/0047339 A1    Mar. 11, 2004

(51) Int. Cl.
*H04L 12/66* (2006.01)

(52) U.S. Cl. ...................................................... 370/352

(58) Field of Classification Search ................. 370/352, 370/260–263, 389–396, 401, 466, 338, 238, 370/522, 271, 410, 400, 328, 261, 329, 331, 370/535, 355, 230; 455/414.1, 422, 414, 455/406–408, 436, 432, 418, 466, 560, 561, 455/412, 405, 558, 550, 411, 419, 421, 435, 455/439–401, 11, 433, 420, 415, 456, 502, 455/426.2; 379/202.01, 219, 114.15, 114.2, 379/201, 102, 110, 88.19, 67.1, 207.15, 211.02, 379/188, 221, 142, 207, 88.17, 229; 709/222–230, 709/200, 249, 52, 10, 64, 7, 1, 219, 203–207, 709/217, 201, 202, 218, 245
See application file for complete search history.

(56) References Cited

U.S. PATENT DOCUMENTS

| 5,541,986 | A | * | 7/1996 | Hou ....................... 379/201.03 |
|---|---|---|---|---|
| 5,629,978 | A | * | 5/1997 | Blumhardt et al. ........... 370/271 |
| 5,696,824 | A | * | 12/1997 | Walsh ........................... 705/75 |
| 5,937,347 | A | * | 8/1999 | Gordon ....................... 455/415 |
| 6,157,708 | A | * | 12/2000 | Gordon .................. 379/207.02 |
| 6,185,288 | B1 | * | 2/2001 | Wong ........................... 379/219 |
| 6,366,577 | B1 | | 4/2002 | Donovan |
| 6,393,120 | B1 | * | 5/2002 | Oltedal ................... 379/221.11 |
| 6,396,914 | B1 | * | 5/2002 | Mirville et al. ......... 379/142.01 |
| 6,446,127 | B1 | | 9/2002 | Schuster et al. |

(Continued)

OTHER PUBLICATIONS

Internet Engineering Task Force (IETF), Request for Comments (RFC) 2543, "SIP: Session Initiation Protocol"; M. Handley et al; Mar. 1999; pp. 1-153.

*Primary Examiner*—Wing F Chan
*Assistant Examiner*—Prenell P Jones (57) ABSTRACT

Systems and methods for controlling features and services in packet-based networks are disclosed. The present application provides systems and methods that include sending a first message to a network core device, and identifying a profile from user account information stored on the network core device. The profile specifies which features and services may or may not be implemented by an end device. In the systems and methods of the present application, the profile is added to a second message that is sent from the network core device to the end device. Alternatively, a single message or multiple messages containing the profile, regardless and/or independent of any prior message sent from an end device, may be sent from the network core device to the end device. These systems and methods may also use the session initiation protocol for their communications, with the end devices being session initiation protocol phones and the network core device being a session initiation server.

26 Claims, 8 Drawing Sheets

U.S. PATENT DOCUMENTS

| | | | |
|---|---|---|---|
| 6,519,242 B1* | 2/2003 | Emery et al. | 370/338 |
| 6,522,876 B1* | 2/2003 | Weiland et al. | 455/414.1 |
| 6,584,490 B1* | 6/2003 | Schuster et al. | 709/200 |
| 6,622,016 B1* | 9/2003 | Sladek et al. | 455/414.1 |
| 6,622,017 B1* | 9/2003 | Hoffman | 455/419 |
| 6,714,987 B1* | 3/2004 | Amin et al. | 709/249 |
| 6,741,695 B1* | 5/2004 | McConnell et al. | 379/229 |
| 6,744,867 B1* | 6/2004 | Chin et al. | 379/142.01 |
| 6,801,604 B2* | 10/2004 | Maes et al. | 379/88.17 |
| 6,839,420 B1* | 1/2005 | Koponen | 379/219 |
| 6,856,676 B1* | 2/2005 | Pirot et al. | 379/201.01 |
| 7,173,925 B1* | 2/2007 | Dantu et al. | 370/352 |
| 2001/0012777 A1* | 8/2001 | Igarashi et al. | 455/435 |
| 2002/0004736 A1* | 1/2002 | Roundtree et al. | 705/10 |
| 2002/0013905 A1* | 1/2002 | Hamada | 713/185 |
| 2002/0034166 A1* | 3/2002 | Barany et al. | 370/329 |
| 2002/0052754 A1* | 5/2002 | Joyce et al. | 705/1 |
| 2002/0126654 A1* | 9/2002 | Preston et al. | 370/352 |
| 2002/0136206 A1* | 9/2002 | Gallant et al. | 370/352 |
| 2002/0138563 A1* | 9/2002 | Trivedi | 709/203 |
| 2002/0138603 A1* | 9/2002 | Robohm | 709/223 |
| 2002/0176404 A1* | 11/2002 | Girard | 370/352 |
| 2002/0188712 A1* | 12/2002 | Caslin et al. | 709/223 |
| 2003/0050896 A1* | 3/2003 | Wiederin | 705/64 |
| 2003/0177099 A1* | 9/2003 | Gallant et al. | 705/52 |
| 2004/0068533 A1* | 4/2004 | Tenhunen et al. | 709/200 |
| 2004/0073566 A1* | 4/2004 | Trivedi | 707/102 |
| 2005/0233741 A1* | 10/2005 | Zamani et al. | 455/432.3 |
| 2006/0080404 A1* | 4/2006 | Haber-Land-Schlosser et al. | 709/218 |

* cited by examiner

ARCHITECTURE AND METHOD FOR CONTROLLING FEATURES AND SERVICES IN PACKET-BASED NETWORKS

FIELD OF INVENTION

The present application relates to an architecture and method for controlling multimedia features and supplementary services in packet-based networks. In particular, the present application relates to an architecture and method for controlling the multimedia features and supplementary services, such as call waiting, call forwarding, and caller identification (ID), that are implemented within Internet Protocol (IP)-based telephony technology, such as a packet-based network using Session Initiation Protocol (SEP) for its communications.

BACKGROUND OF THE INVENTION

Changes in the telecommunications market since the 1996 Telecommunications Act passed have pushed carriers far beyond their original core business of providing basic connectivity. Technological advancements and customer demands have compelled telephone companies and Internet service providers to provide communication "solutions" rather than just a dial tone. As such, service providers are always on the lookout for that next "killer" suite or creative service that will increase customer loyalty and create new revenue streams.

But carriers are faced with a problem. Today's legacy public switched telephone network (PSTN), while reliable and robust, is built on hardware-based circuit switches that leave little room for innovation and service differentiation. Many carriers are solving this problem by migrating networks to IP-based technology, but they may still have huge investments in the PSTN hardware that are not fully depreciated. This means that as network migration continues, a hybrid PSTN/IP environment will emerge, with traffic being directed across both the PSTN and IP systems.

One issue that will need to be addressed in both the IP and hybrid PSTN/IP telephony environments is how customers will be provided with multimedia features and supplementary services, such as call waiting, call forwarding, caller ID, call transfer, call conferencing, call hold, speed calling, and the like. In the traditional PSTN environment, service providers (i.e., the carriers) rely on network-centric devices to provide such multimedia features and supplementary services to the users. Customers can obtain these services by either subscribing or paying per usage. Because it is the network-centric devices, not the end device (e.g., the phone in the customer premises), that provide these features and services, service providers can easily control whether they should be provided per user basis based on the subscription status. This capability of screening the service delivery makes the service charging possible.

When IP-based telephony technology, such as SIP, emerges, many end devices may be able to provide the multimedia features and supplementary services without permission from the network-centric devices of the service providers. As a result, the capability of controlling the feature/service delivery from these network-centric devices may also be deteriorated. Under this scenario, service providers will likely be able to only enable uniform multimedia features and supplementary services for all of its customer's end devices or rely on static provisioning for each such end device to enable/disable certain unwanted features/services.

Uniform feature delivery is neither desirable to service providers nor flexible to the customers. For example, in the Centrex environment, the customer (e.g., business user) may not want those Centrex phones dedicated to guest usage to have the same sets of capability as those used by its employees. On the other hand, static provisioning of each phone separately requires high management and maintenance efforts, and also does not meet the requirement of delivering the features on a per user account basis (i.e., such provisioning is delivered on a per end device basis).

Accordingly, service providers want a mechanism of better controlling the multimedia features and supplementary services delivery from the network core, even though these multimedia features and supplementary services are actually provided by the end devices that reside in the end user premises. The present invention defines an architecture and mechanism for network core devices (e.g., SIP servers) to control end devices (e.g., SIP phones) to deliver the multimedia features and supplementary services dynamically and based on per user account profiles. With the architecture and mechanism of the present invention, service providers can selectively provide these services to proper groups of users by indicating such feature/service information in the communication packets (e.g., SIP messages). The end devices used with the present invention will also provide multimedia features and supplementary services only as directed in such communication packets. Consequently, service providers will regain network-concentric control over the multimedia features and supplementary services that they provide in an IP or hybrid PSTN/IP telephony system.

SUMMARY OF THE INVENTION

The present application provides a method for controlling features and services in packet-based networks comprising the step of identifying a profile, specifying which features and services may or may not be implemented by an end device, from user account information stored on a network core device. The method also comprises the steps of adding the profile to at least one message, and sending the at least one message from the network core device to the end device.

Moreover, the present application provides another method for controlling features and services in packet-based networks that comprises the steps of sending a first message to a network core device, and identifying a profile, specifying which features and services may or may not be implemented by an end device, from user account information stored on the network core device. The method further comprises the steps of adding the profile to a second message, and sending the second message from the network core device to the end device.

The present application also provides yet another method for controlling features and services in packet-based networks using the session initiation protocol that comprises the steps of sending a first message to a session initiation protocol server, and identifying a profile, specifying which features and services may or may not be implemented by a session initiation protocol phone, from user account information stored on the session initiation protocol server. The method further comprises the steps of adding the profile to a second message, and sending the second message from the session initiation protocol server to the session initiation protocol phone.

In addition, the present application provides a system for controlling features and services in packet-based networks communications. The system comprises an end device in communication with a network core device, and a profile identified from user account information stored on the network core device. The profile specifies which features and services may or may not be implemented by the end device. The system further comprises at least one message including the profile, wherein the at least one message is sent from the network core device to the end device, and the end device implements only the features and services allowed to be implemented by the profile of the at least one message.

Furthermore, the present application provides another system for controlling features and services in packet-based networks communications. The system comprises a first end device in communication with a network core device, and a second end device in communication with the network core device. The second end device is also in communication with the first end device via the network core device. The system also comprises a profile identified from user account information stored on the network core device, with the profile specifying which features and services may or may not be implemented by an end device. The system further comprises a first message and a second message, with the second message including the profile. In this system of the present application, the first message is sent from an end device to the network core device, the second message is sent from the network core device to an end device, and the end device receiving the second message implements only the features and services allowed to be implemented by the profile of the second message.

DETAILED DESCRIPTION OF EXEMPLARY EMBODIMENTS

Figure 1:
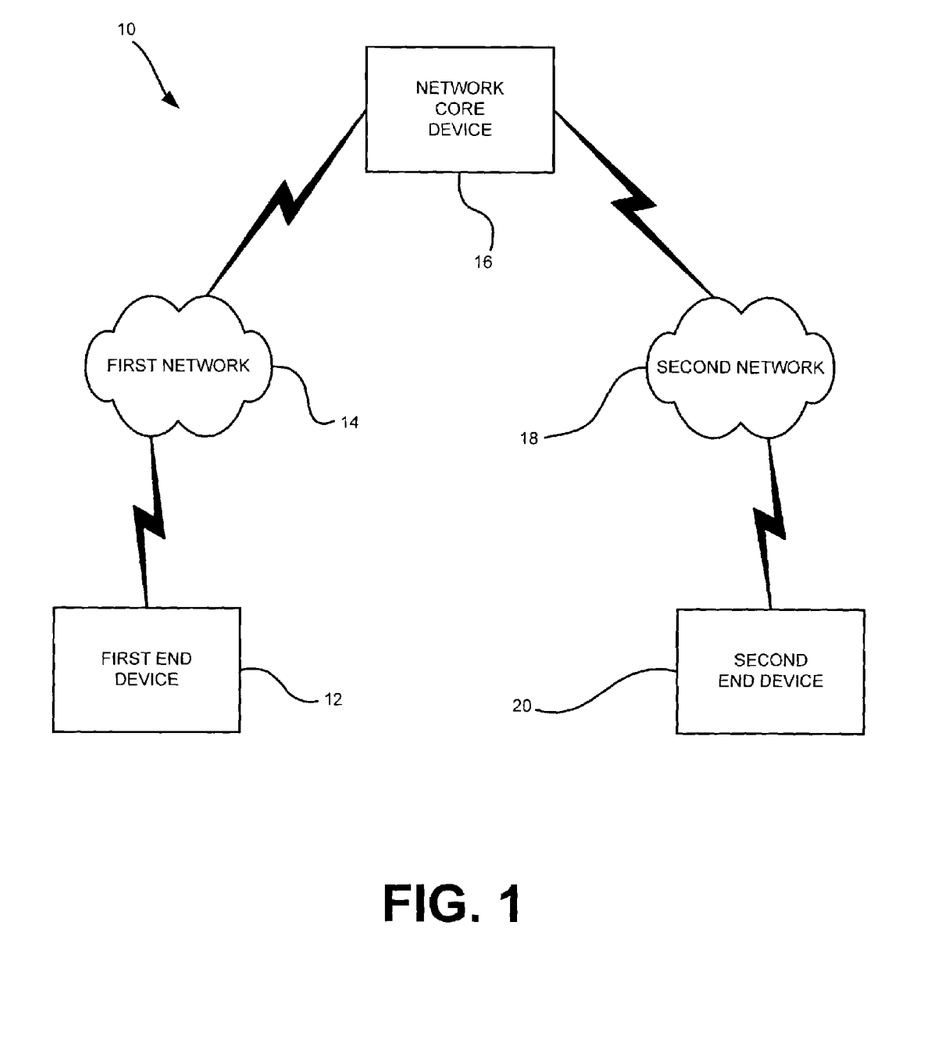
FIG. 1 is a block diagram illustrating an exemplary system and method of the present invention for controlling features and services used by packet-based network devices.

FIG. 1 shows an exemplary embodiment of a system 10 and method for controlling multimedia features and supplementary services used by packet-based network devices. The system 10 comprises a first end device 12, a first network 14, a network core device 16, a second network 18, and a second end device 20. As shown in FIG. 1, the first and second end devices 12, 20 are in communication with the first and second networks 14, 18, respectively, and the first and second networks 14, 18 are both in communication with the network core device 16. As a result, the network core device 16 bridges communications between the first and second end devices 12, 20 across their respective networks (i.e., the first and second networks 14, 18). It should be understood, however, that although a first and a second network are shown in FIG. 1 and described herein, the first and second networks 14, 18 may be one in the same, thereby resulting in both the first and second end devices 12, 20 being in communication with, and residing on, the same single network. It should also, be understood the communication between the devices and networks may be physically established via wireline, wireless, or a combination of wireline and wireless links.

In the system 10, the first and second end devices 12, 20 are preferably packet-enabled network devices, such as personal computers, handheld computer devices (e.g., Personal Digital Assistants (PDAs)), cellular phones, SIP phones, and other "intelligent" or "smart" phones, that are located on the premises and under the control of the end user or customer. Likewise, the first and second networks 14, 18 are preferably packet-based networks.

The network core device 16 is also preferably a centrally located and controlled server device, such as an SIP server, that is located on the service provider's premises and controlled by the service provider. Preferably, the network core device 16 contains account information for each of the end users or customers subscribing to the service provided by the service provider. The account information may include such information as the customer's billing address, an identification of the customer's devices, and a list of the features and services to which the customer has subscribed.

Figure 2:
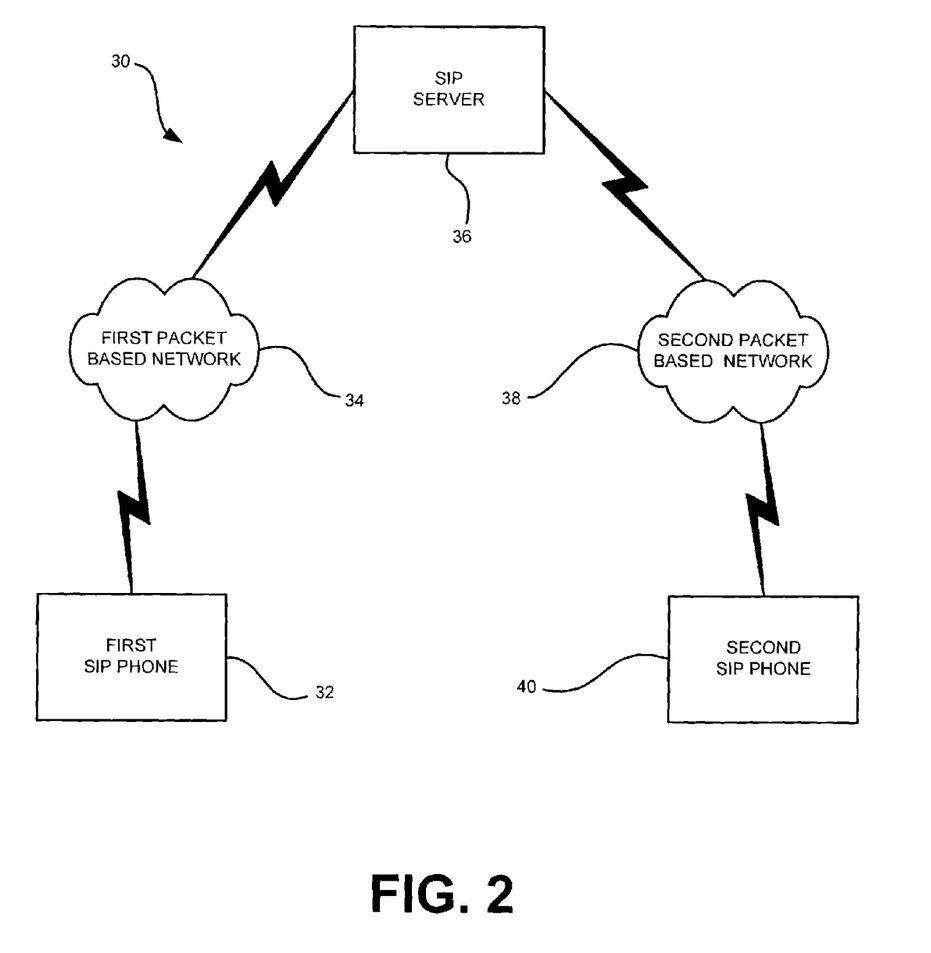
FIG. 2 is a block diagram illustrating an exemplary system and method of the present invention for controlling features and services used by SIP devices.

FIG. 2 illustrates an exemplary system 30 and method implementation of the system 10 and method of FIG. 1 using SIP. As shown in FIG. 2, the system 30 comprises a first SIP phone 32, a first packet based network 34, an SIP server 36, a second packet based network 38, and a second SIP phone 40. The first and second SIP phones 32, 40 correspond to the first and second end devices 12, 20, and may be any suitable phone that uses SIP for its communications. It should be understood that while SEP phones are used as end devices in FIG. 2, any other network device using SIP for its communications may be used as the end devices.

The first and second packet based networks 34, 38 correspond to the first and second networks 14, 18. In addition, the SIP server 36 corresponds to the network core device 16. In the system 30, the SIP phones, the packet based networks, and the SIP server are all in the same communication as their corresponding devices and networks in the system 10. As with the system 10 of FIG. 1, it should also be understood that although a first and a second packet based network are shown in FIG. 2 and described herein, the first and second packet based networks 34, 38 may be one in the same, thereby resulting in both the first and second SIP phones 32, 40 being in communication with, and residing on, the same single packet based network. It should be further understood the communication between the SIP phones, the packet based networks, and the SIP server may be physically established via wireline, wireless, or a combination of wireline and wireless links.

The systems 10, 30 of FIGS. 1-2 both operate in the same manner. One of the end devices/phones sends a message (e.g., a REGISTER or INVITE message) to the network core device/server or to the other end device/phone via the network core device/server. After receiving this message, the network core device/server looks up account information for the user of end device/phone that sent the message (and/or the end device/phone that is receiving the message) and identifies a profile of the features and services that the user subscribes to or has canceled. These features and services may include any number of different multimedia features and supplementary services, such as call waiting, call forwarding, caller ID, call transfer, call conferencing, call hold, speed calling, and the like.

Once the profile for the user has been identified, the network core device/server adds the profile to the header of a response message or to the header of the original message (thereby creating a new message consisting of the original message plus the profile information). Alternatively, the network core device/server may add the profile to the header of any other message that is being sent from the network core device/server to an end device, regardless and/or independent of any previous message being sent from an end device. Any number of different formats may be used to add the profile information to the message header, depending on what communication protocol is being used by the end devices/phones and the network core device/server. As one example, if SIP is used as the communication protocol, then the profile information may be added to the message header by inserting "X-multimedia-service-enabled:" into the header, followed by a list of the features and services that are subscribed to (e.g., "yes") and/or canceled (e.g., "no").

It should be understood that the profile information may be added to more than one message being sent from the network core device/server to an end device. In addition, the profile information may be broken up and added in pieces to multiple messages being sent from the network core device/server to an end device. For example, some profile information may be sent from the network core device/server to an end device as part of a response message, while other profile information may be sent from the network core device/server to an end device as part of a new message that includes the original message.

After adding the profile information to the message, the network core device/server then sends the new message back to the end device/phone that sent the original message (or the other end device/phone designated to receive the original message). Upon receiving the new message containing the profile, the end device/phone preferably implements only features and services as specified and set forth in the profile. Such implementation preferably occurs regardless of the individual capabilities of the end device/phone. As a result, control of the features and services utilized by a user or subscriber is restored to and maintained centrally by the service provider.

FIGS. 3-8 and the below description provide further details about the exemplary methods of the present invention and the operation of the systems 10, 30 of FIGS. 1-2. Before proceeding to FIGS. 3-8 and this description, however, a general description of SIP will be provided.

As is known in the art, SIP defines a protocol for establishing, modifying and terminating sessions over packet data networks, such as IP networks. For example, SIP can be used to establish real-time data sessions and Internet telephony sessions, such as VoIP sessions. Of course, SIP can be used to establish many other types of sessions. SIP also supports name-mapping and redirection services, which allows a user to initiate a session from different locations and allows the user to be identified at the various different locations.

SIP users, and thus their devices, are identified using SIP identifiers, which are typically telephone numbers or web host names. For example, an SIP identifier could be of the form "SIP:name@domain.com." Of course, SIP supports other types of identifiers. An SIP user can register with a SIP server, such as by sending a registration message that identifies the user and the user's current location. Once registered with the SIP server, the SIP server can be used to facilitate establishing a session between two devices.

For example, the SIP server can receive a request from a first device (e.g., a first SIP phone) that wants to use SIP to establish a session with a second device (e.g., a second SIP phone). The first device and/or the second device could previously have registered with the SIP server via a REGISTER message. In response to the REGSITER message from the first and/or second devices, the SIP server could send a response message called "200 OK," wherein the "200" represents that the message is a response to a register request and the "OK" represents that the registration request has been accepted. The first device could send the SIP server a request to establish a session with the second device in the form of an SIP INVITE message. The SIP server could then forward the request directly to the second device. Alternatively, the first device could send the SIP INVITE message directly to the second device. In either scenario, the second device would send a response message (e.g., "200 OK") to first device via the SIP server.

SIP generally runs at the application layer of the Open Systems Interconnection ("OSI") model. SIP messages can then be carried by protocols running at lower layers of the OSI model, but SIP is not confined to using specific lower level protocols. Consequently, SIP messages, such as an SIP REGISTER message that can be used to register a device with an SIP server, or an SIP INVITE message that can be used to establish a session, can be sent using any transport protocol. For example, SIP messages can be transmitted using the Transmission Control Protocol ("TCP") or the Universal Datagram Protocol ("UDP"). TCP and UDP typically run at the transport layer of the OSI reference model. Of course, these protocols can be used in conjunction with protocols running at even lower levels of the Open Systems Interconnection ("OSI") reference model. For example, UDP or TCP could be used in conjunction with IP, which typically runs at the network layer of the OSI reference model.

SIP is described in more detail in Internet Engineering Task Force ("IETF") Request for Comment ("RFC") 2543, "SIP: Session Initiation Protocol," Handley et al., March 1999, which is specifically incorporated herein by reference in its entirety.

Figure 3:
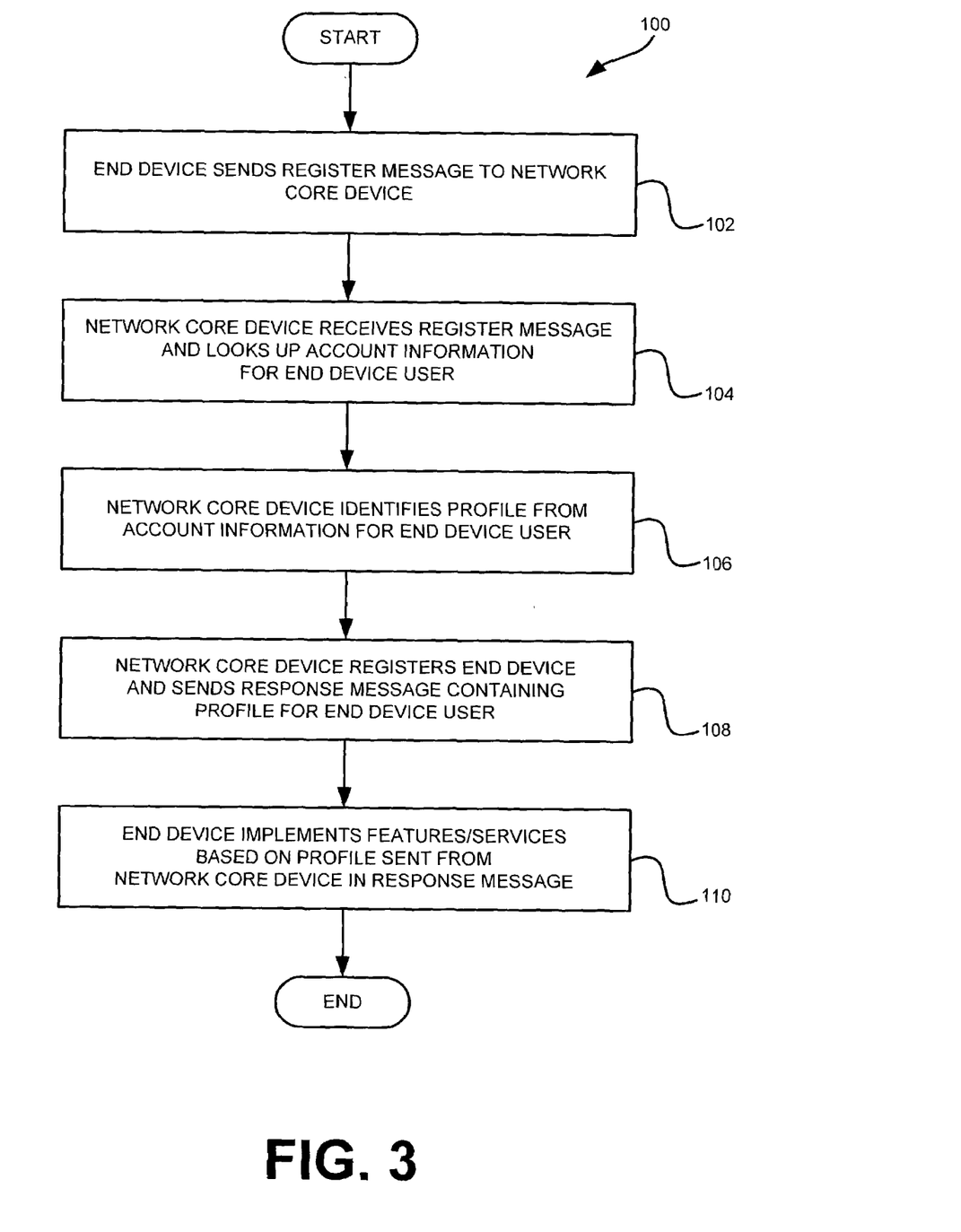
FIG. 3 is a flow diagram illustrating control via a register message of features and services used by an end device.

Turning now to FIG. 3, the method 100 for controlling the features/services implemented by an end device begins with Step 102, wherein an end device (e.g., first end device 12) sends a REGSITER message to the network core device 16. In Step 104, the network core device receives the REGISTER message from the end device, and looks up the account information that is stored on the network core device and corresponds to the user of the end device. This account information may include details regarding the user, his or her billing information, his or her end devices, and the features/services that he or she has subscribed to and/or canceled. As previously mentioned, such features/services may include call waiting, call forwarding, caller ID, call transfer, call conferencing, call hold, speed calling, and the like.

Next, in Step 106, the network core device examines the account information and identifies a profile for the end device from the account information corresponding to the user of the end device. Preferably, the profile includes information describing what features/services the user has subscribed to and/or canceled. For example, the profile information may indicate that a user or customer has subscribed to call forwarding and caller ID, but has canceled call waiting. Alternatively, the profile may indicate only those features/services that the user has subscribed to, and by default, all other features that have not been subscribed to are treated as canceled by the user. Preferably, but not necessarily, the profile information is the same for every end device identified in the user's account information as being associated with the user.

In other words, a single profile of subscribed/canceled features and services may be used for each of a user's end devices.

As shown in FIG. 3, the method 100 continues with Step 108, wherein the network core device registers the end device, and sends a response message to the end device indicating such registration and containing the profile information for the user of the end device. The network core device may add the profile information to a single message, or alternatively, multiple messages being sent from the network core device to the end device. In addition, the profile information may be broken up and added in pieces to multiple messages being sent from the network core device to the end device. For ease of reference and illustration purposes, only a single message is described in detail as containing the profile information in the exemplary embodiments of the present application. It should be understood, however, that any number of different messages and message formats may be used to contain and convey the profile information from the network core device to the end device.

After receiving the response message from the network core device, the end device implements the features/services specified in the profile contained within the response message in step 110. Preferably, the end device implements only those features/services specified in the profile. For example, if the profile information specifies that the user has subscribed to call forwarding and caller ID, but has canceled call waiting, the end device will be enabled with call forwarding and caller ID capabilities, but not call waiting. In addition, or alternatively, the end device may enable only those features/services indicated in the profile as being subscribed to by the user, and may disable all other features/services not indicated in the profile as being subscribed to by the user (regardless of whether such features/services are indicated in the profile as canceled by the user). The end device then proceeds to communicate with other end devices based on its profile, and the method 100 ends.

Although not shown, it should be understood that the network core device may decide to reject a registration request and any subsequent call signaling from any end devices that are not capable of reading messages containing profile information or that are not capable of implementing only features/services specified in the profile information. By preventing end devices that are not restricted and bound by message profile information from registering with the network core device (and thus preventing them from communicating with other end devices via a service provider's network), service/network providers retain control over what features/services are implemented by its end devices.

It should also be understood that the network core device may send the profile information corresponding to a user's account information in a message other than a response to a registration request. In other words, the network core device may simply send an end device a message that contains the profile information that controls which features/services the end device may or may not implement, and the message need not be a response message sent after a register message. Indeed, profile information may be conveyed to an end device by adding the profile information to any message (or messages) sent from the network core device to the end device at any time.

Figure 4:
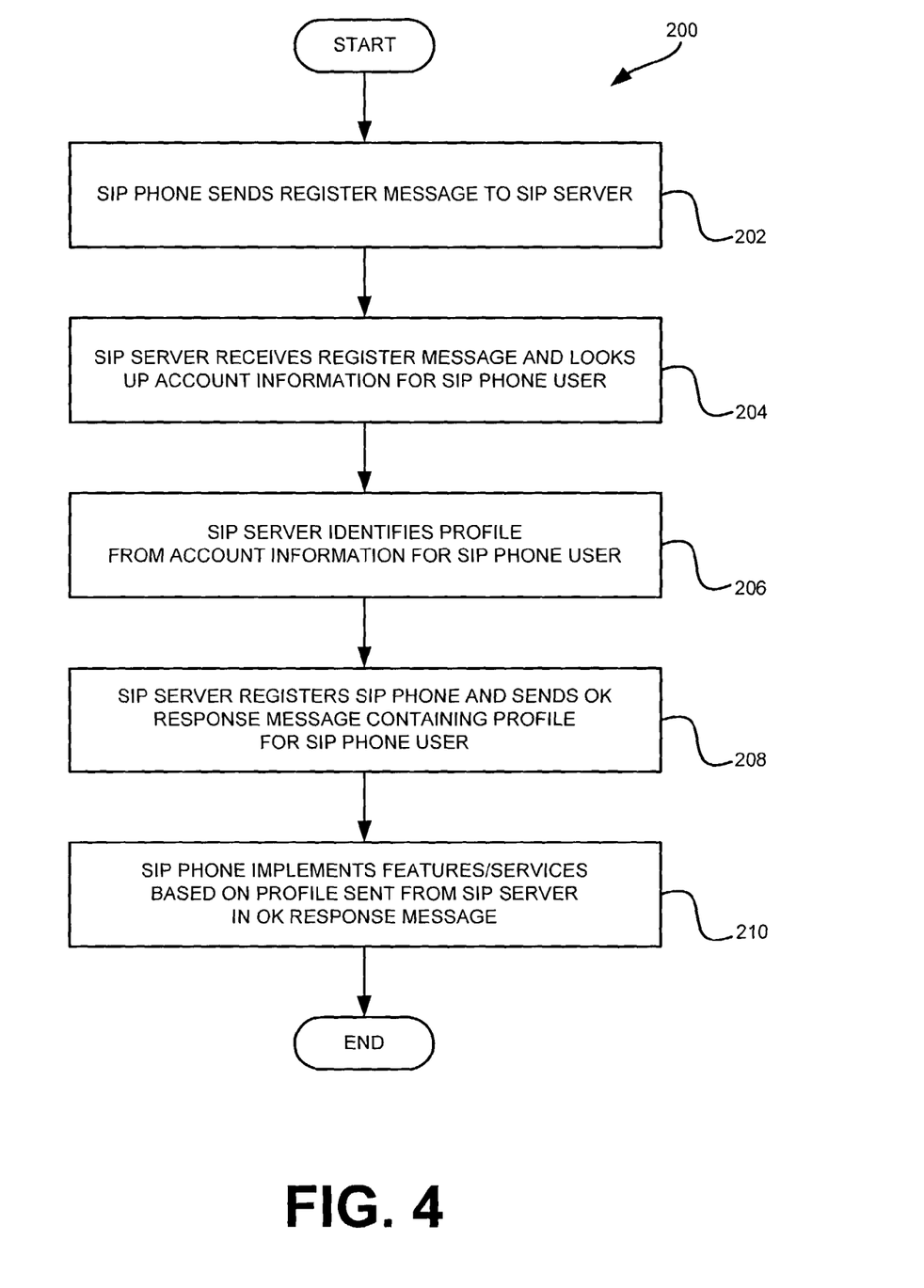
FIG. 4 is a flow diagram illustrating control via a register message of features and services used by an SIP phone.

Turning now to FIG. 4, the method 200 for controlling the features/services implemented by an SIP device begins with Step 202, wherein an SIP device (e.g., first SIP phone 32) sends a REGSITER message to the SIP server (e.g., SIP server 36). Table 1 illustrates an exemplary format for this REGISTER message.

TABLE 1

REGISTER sip:whatever.net SIP/2.0
To: sm@whatever.net
From: sm@whatever.net
CSeq: 1 REGISTER
Contact: sip:sm@149.112.90.46
Expires: 3600

As shown in Table 1, the SIP phone is identified by its e-mail address, which in this example is sm@whatever.net. It should be understood that the REGSITER message format shown in Table 1 is merely exemplary, and other formats may be used for the REGISTER message of the present invention.

In Step 204, the SIP server receives the REGISTER message from the SIP phone, and looks up the account information that is stored on the SIP server (or another server or storage device in communication with the SIP server) and corresponds to the user of the SIP phone. This account information may include details regarding the user, his or her billing information, his or her end devices, and the features/services that he or she has subscribed to and/or canceled. As previously mentioned, such features/services may include call waiting, call forwarding, caller ID, call transfer, call conferencing, call hold, speed calling, and the like.

Next, in Step 206, the SIP server examines the account information and identifies a profile for the SIP phone from the account information corresponding to the user of the SIP phone. Preferably, the profile includes information describing what features/services the user has subscribed to and/or canceled. For example, the profile information may indicate that a user or customer has subscribed to call forwarding and caller ID, but has canceled call waiting. Alternatively, the profile may indicate only those features/services that the user has subscribed to, and by default, all other features that have not been subscribed to are treated as canceled by the user. Preferably, but not necessarily, the profile information is the same for every SIP phone identified in the user's account information as being associated with the user. In other words, a single profile of subscribed/canceled features and services may be used for each of a user's SIP phones.

As shown in FIG. 4, the method 200 continues with Step 208, wherein the SIP server registers the SIP phone, and sends a response message to the SIP phone indicating such registration and containing the profile information for the user of the SIP phone. Preferably, the response message is a 200 OK response message containing a header line setting forth the identified profile for the user. Table 2 illustrates an exemplary format for this 200 OK response message.

TABLE 2

SIP/2.0 200 OK
To: sm@whatever.net
From: sm@whatever.net
CSeq: 1 REGISTER
Contact: sip:sm@149.112.90.46
X-multimedia-service-enabled: CW=yes, CCW=yes, CND=no
Expires: 3600

As shown in Table 2, the profile is contained within the "X-multimedia-service-enabled" field, with enabled or subscribed features/services being indicated with a "yes" and disabled or canceled features/services being indicated with a "no." In this example, call waiting (CW) is enabled, cancel call waiting (CCW) is enabled, and caller number delivery (CND) is disabled (i.e., not subscribed to by the user).

It should be understood that the 200 OK response message format shown in Table 2 is merely exemplary, and other formats may be used for the response message of the present invention. As one example, the profile line following the "X-multimedia-service-enabled" field may simply list only the features/services that are enabled for (i.e., subscribed to by) the user, as opposed to listing both the features/services that are enabled and disabled. With this response message format, every feature/service not listed in the profile may be treated as disabled.

It should also be understood that the SIP server may add the profile information to a single message, or alternatively, multiple messages being sent from the SIP server to the SIP phone. In addition, the profile information may be broken up and added in pieces to multiple messages being sent from the SIP server to the SIP phone. For ease of reference and illustration purposes, only a single message is described in detail as containing the profile information in the exemplary embodiments of the present application. It should be understood, however, that any number of different messages and message formats may be used to contain and convey the profile information from the SIP server to the SIP phone.

After receiving the response message from the SIP server, the SIP phone implements the features/services specified in the profile contained within the response message in step 210. Preferably, the SIP phone implements only those features/services specified in the profile. Using the above example illustrated in Table 2, if the profile information specifies that the user has subscribed to the call waiting and cancel call waiting services, but has not subscribed (or has canceled) the caller name delivery service, the SIP phone will be enabled with call waiting and cancel call waiting capabilities, but not call name delivery. In addition, or alternatively, the SIP phone may enable only those features/services indicated in the profile as being subscribed to by the user, and may disable all other features/services not indicated in the profile as being subscribed to by the user (regardless of whether such features/services are indicated in the profile as disabled or canceled by the user). The SIP phone then proceeds to communicate with other SIP phones based on its profile, and the method 200 ends.

Although not shown, it should be understood that the SIP server may decide to reject a registration request and any subsequent call signaling from any SIP phones that are not capable of reading messages containing profile information or that are not capable of implementing only features/services specified in the profile information. By preventing SIP phones that are not restricted and bound by message profile information from registering with the SIP server (and thus preventing them from communicating with other SIP phones via a service provider's network), service/network providers retain control over what features/services are implemented by its SIP phones.

It should also be understood that the SIP server may send the profile information corresponding to a user's account information in a message other than a response to a registration request. In other words, the SIP server may simply send an SIP phone a message that contains the profile information that controls which features/services the SIP phone may or may not implement, and the message need not be a 200 OK response message sent after a REGISTER message. Indeed, profile information may be conveyed to an SIP phone by adding the profile information to any message sent from the SIP server to the SIP phone at any time.

Figure 5:
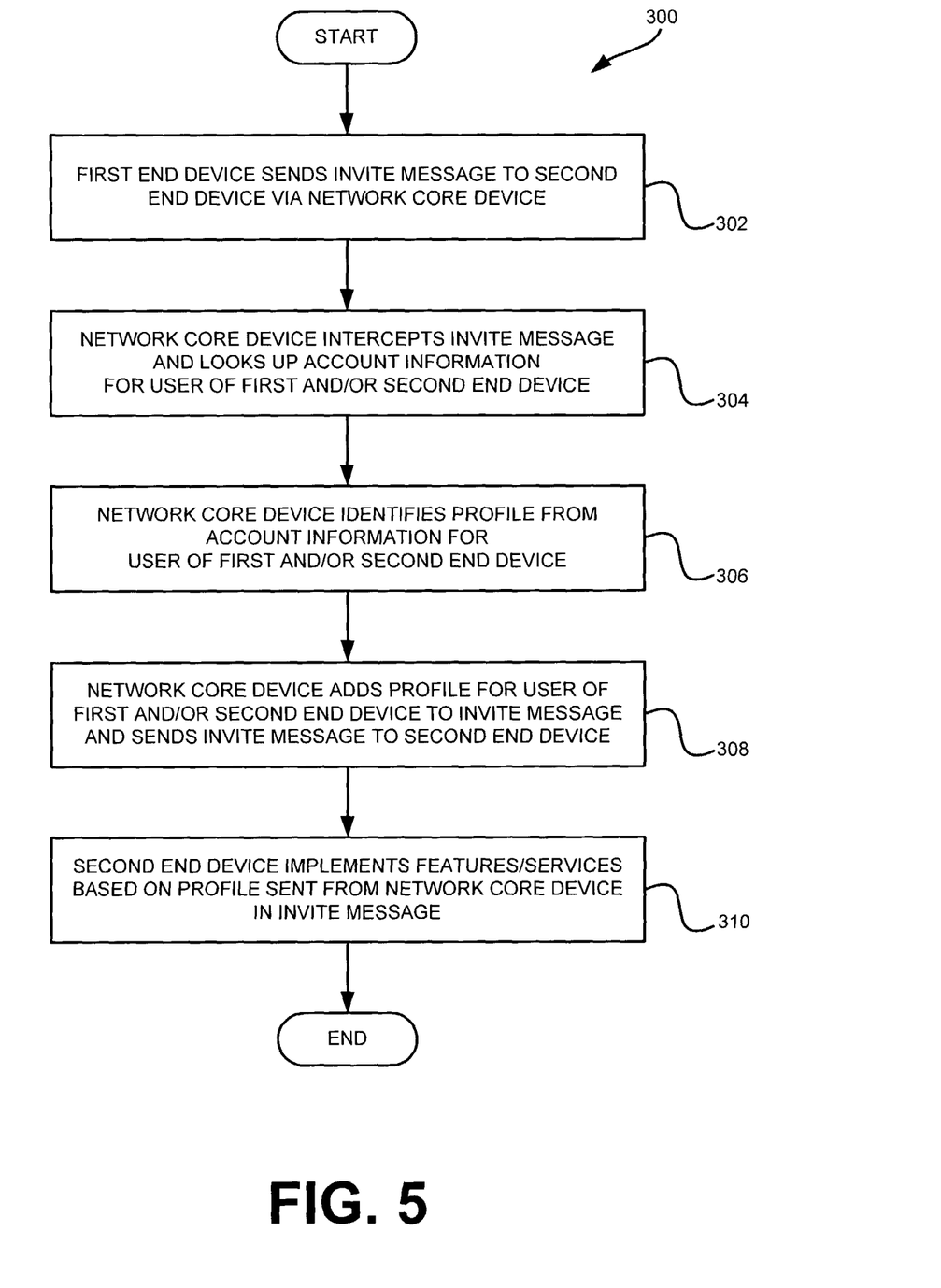
FIG. 5 is a flow diagram illustrating control via an invite message of features and services used by an end device.

Turning now to FIG. 5, the method 300 for controlling the features/services implemented by an end device begins with Step 302, wherein an end device (e.g., first end device 12) sends a first INVITE message to another end device (e.g., second end device 20) via the network core device 16. In Step 304, the network core device receives the first INVITE message from the first end device, and looks up the account information that is stored on the network core device and corresponds to the user of the first end device. In addition, or alternatively, the network core device may look up, in Step 304, the account information that is stored on the network core device and corresponds to the user of the second end device.

Next, in Step 306, the network core device examines the account information and identifies a profile for the second end device from the account information corresponding to the user of the first end device. Preferably, the profile includes information describing what features/services the user of the first end device has subscribed to and/or canceled, and that may need to be implemented by the second end device. For example, the profile information may indicate that a user or customer has subscribed to cancel call waiting, which may be implemented by the second end device (in addition to the first end device) to provide a call that is not disturbed by call waiting on either end.

The network core device may also identify, in Step 306, a profile for the second end device from the account information corresponding to the user of the second end device. Preferably, the profile includes information describing what features/services the user of the second end device has subscribed to and/or canceled. This profile information corresponding to the user of the second end device may be combined with, or substituted for, the profile information corresponding to the user of the first end device.

As shown in FIG. 5, the method 300 continues with Step 308, wherein the network core device adds the profile information for the user of the first end device to the first INVITE message, thereby forming a second INVITE message, and sends the second INVITE message with the profile information to the second end device. As mentioned above, the profile information contained within the second INVITE message may also include profile information for the user of the second end device, or alternatively, may only include profile information for the user of the second end device. As also mentioned above, the profile information may be added to a single message, a plurality of messages with each message including all of the profile information, or a plurality of messages with each message including only a portion (preferably a different portion) of the profile information.

After receiving the second INVITE message from the network core device, the second end device implements the features/services specified in the profile contained within the second INVITE message in step 310. Preferably, the second end device implements only those features/services specified in the profile. More preferably, the second end device only implements those features/services that are specified in the portion of the profile which pertains to the user of the first end device for the duration of the communication between the first and second end devices. Referring back to FIG. 5, the second end device then proceeds to communicate with the first end device based on the profile, and the method 300 ends.

Figure 6:
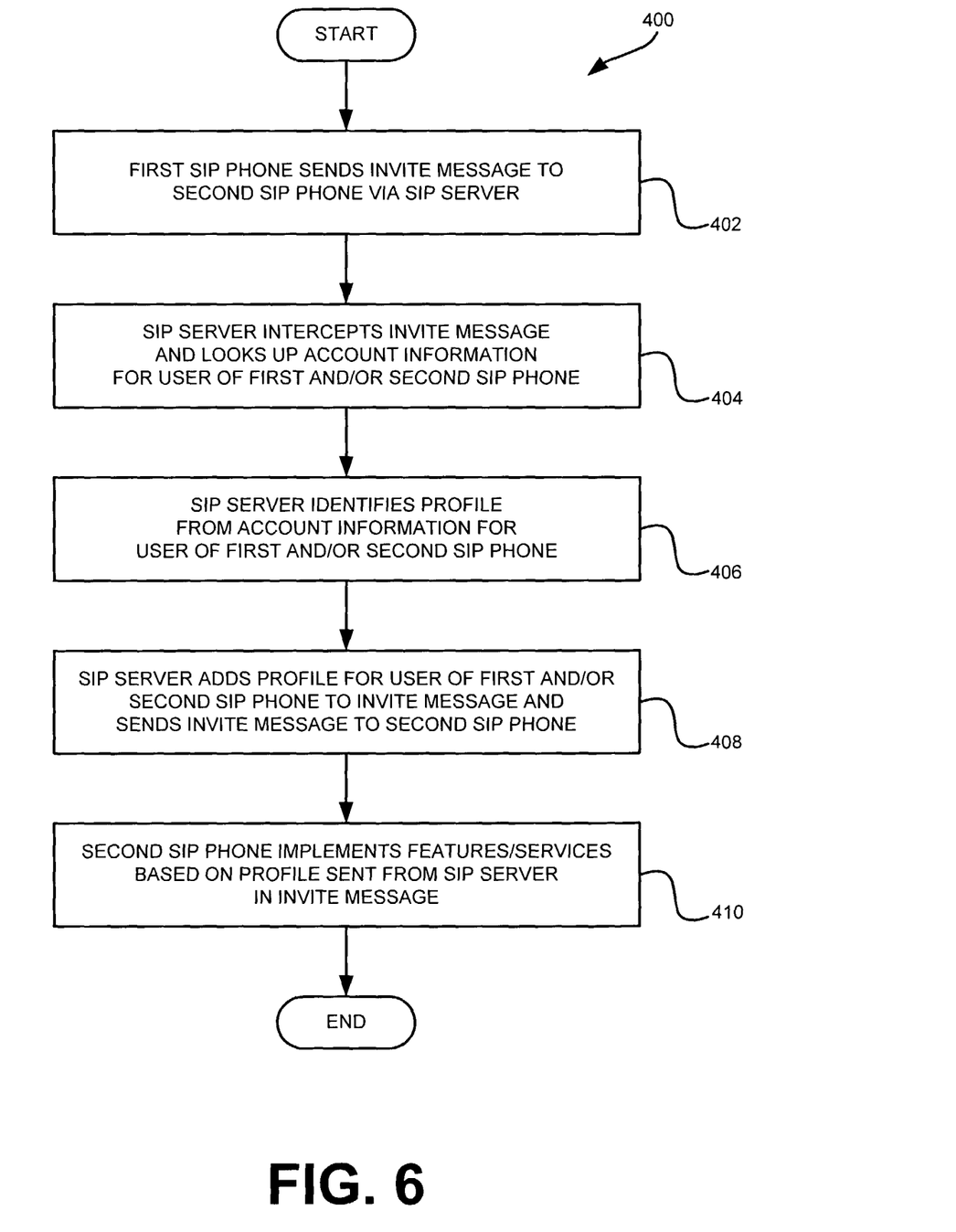
FIG. 6 is a flow diagram illustrating control via an invite message of features and services used by an SIP phone.

Turning now to FIG. 6, the method 400 for controlling the features/services implemented by an SIP device begins with Step 402, wherein an SIP device (e.g., first SIP phone 32) sends a first INVITE message to another SIP device (e.g., the second SIP phone 40) via the SIP server (e.g., SIP server 36). Table 3 illustrates an exemplary format for this first INVITE message.

TABLE 3

INVITE sip:wherever.net SIP/2.0
To: br@wherever.net
From: sm@whatever.net
CSeq: 1 INVITE
Subject: initiating call

TABLE 4

INVITE sip:wherever.net SIP/2.0
To: br@wherever.net
From: sm@whatever.net
CSeq: 1 INVITE
Subject: initiating call
X-multimedia-service-enabled: CW=yes, CCW=yes, CND=no As shown in Table 3, the first SIP phone (i.e., the caller) is identified by its e-mail address, which in this example is sm@whatever.net, and the second SIP phone (i.e., the callee) is identified by its e-mail address, which in this example is br@wherever.net. It should be understood that the first INVITE message format shown in Table 3 is merely exemplary, and other formats may be used for the first INVITE message of the present invention.

In Step 404, the SIP server receives the first INVITE message from the first SIP phone, and looks up the account information that is stored on the SIP server and corresponds to the user of the first SIP phone. In addition, or alternatively, the SIP server may look up, in Step 304, the account information that is stored on the SIP server and corresponds to the user of the second SIP phone.

Next, in Step 406, the SIP server examines the account information and identifies a profile for the second SIP phone from the account information corresponding to the user of the first SIP phone. Preferably, the profile includes information describing what features/services the user of the first SIP phone has subscribed to and/or canceled, and that may need to be implemented by the second SIP phone. For example, the profile information may indicate that a user or customer has subscribed to cancel call waiting, which may be implemented by the second SIP phone (in addition to the first SIP phone) to provide a call that is not disturbed by call waiting on either end.

The SIP server may also identify, in Step 406, a profile for the second SIP phone from the account information corresponding to the user of the second SIP phone. Preferably, the profile includes information describing what features/services the user of the second SIP phone has subscribed to and/or canceled. This profile information corresponding to the user of the second SIP phone may be combined with, or substituted for, the profile information corresponding to the user of the first SIP phone.

As shown in FIG. 6, the method 400 continues with Step 408, wherein the SIP server adds the profile information for the user of the first SIP phone to the first INVITE message, thereby forming a second INVITE message, and sends the second INVITE message with the profile information to the second SIP phone. As mentioned above, the profile information contained within the second INVITE message may also include profile information for the user of the second SIP phone, or alternatively, may only include profile information for the user of the second SIP phone. As also mentioned above, the profile information may be added to a single message, a plurality of messages with each message including all of the profile information, or a plurality of messages with each message including only a portion (preferably a different portion) of the profile information.

Table 4 illustrates an exemplary format for this second INVITE message containing the profile information.

As shown in Table 4, the profile is contained within the "X-multimedia-service-enabled" field, with enabled or subscribed features/services being indicated with a "yes" and disabled or canceled features/services being indicated with a "no." In this example, call waiting (CW) is enabled, cancel call waiting (CCW) is enabled, and caller number delivery (CND) is disabled (i.e., not subscribed to by the user). Again, it should be understood that the second INVITE message format shown in Table 4 is merely exemplary, and other formats may be used for the second INVITE message of the present invention.

After receiving the second INVITE message from the SIP server, the second SIP phone implements the features/services specified in the profile contained within the second INVITE message in step 410. Preferably, the second SIP phone implements only those features/services specified in the profile. More preferably, the second SIP phone only implements those features/services that are specified in the portion of the profile which pertains to the user of the first SIP phone for the duration of the communication between the first and second SIP phones. Referring back to FIG. 6, the second SIP phone then proceeds to communicate with the first SIP phone based on the profile, and the method 400 ends.

Figure 7:
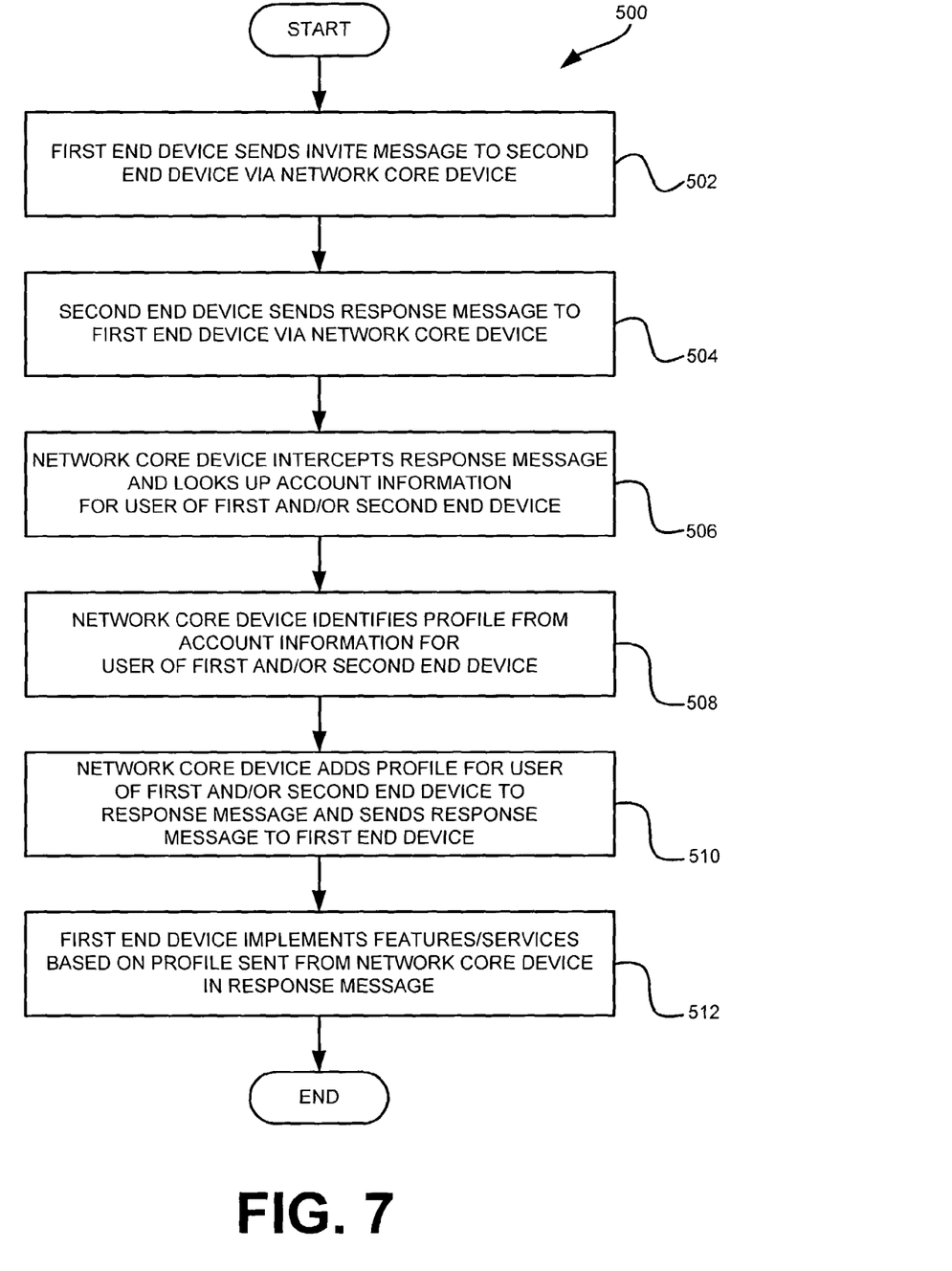
FIG. 7 is a flow diagram illustrating control via a response message of features and services used by an end device.

Turning now to FIG. 7, the method 500 for controlling the features/services implemented by an end device begins with Step 502, wherein an end device (e.g., first end device 12) sends an INVITE message to another end device (e.g., second end device 20) via the network core device 16. In Step 504, after receiving the INVITE message, the second end device sends a response message to the first end device via the network core device. In Step 506, the network core device intercepts the response message sent from the second device, and looks up the account information that is stored on the network core device and corresponds to the user of the second end device. In addition, or alternatively, the network core device may look up, in Step 506, the account information that is stored on the network core device and corresponds to the user of the first end device.

Next, in Step 508, the network core device examines the account information and identifies a profile for the first end device from the account information corresponding to the user of the second end device. Preferably, the profile includes information describing what features/services the user of the second end device has subscribed to and/or canceled, and that may need to be implemented by the first end device. For example, the profile information may indicate that a user or customer has subscribed to cancel call waiting, which may be implemented by the first end device (in addition to the second end device) to provide a call that is not disturbed by call waiting on either end.

The network core device may also examine the account information and identify, in Step 508, a profile for the first end device from the account information corresponding to the user of the first end device. Preferably, the profile includes information describing what features/services the user of the first end device has subscribed to and/or canceled. This profile information corresponding to the user of the first end device may be combined with, or substituted for, the profile information corresponding to the user of the second end device.

As shown in FIG. 7, the method 500 continues with Step 510, wherein the network core device adds the profile information for the user of the second end device to the response message, and sends the response message with the profile information to the first end device. As mentioned above, the profile information contained within the response message may also include profile information for the user of the first end device, or alternatively, may only include profile information for the user of the first end device. As also mentioned above, the profile information may be added to a single message, a plurality of messages with each message including all of the profile information, or a plurality of messages with each message including only a portion (preferably a different portion) of the profile information.

After receiving the response message from the network core device, the first end device implements the features/services specified in the profile contained within the response message in step 512. Preferably, the first end device implements only those features/services specified in the profile. More preferably, the first end device only implements those features/services that are specified in the portion of the profile which pertains to the user of the second end device for the duration of the communication between the first and second end devices. Referring back to FIG. 7, the first end device then proceeds to communicate with the second end device based on the profile, and the method 500 ends.

Figure 8:
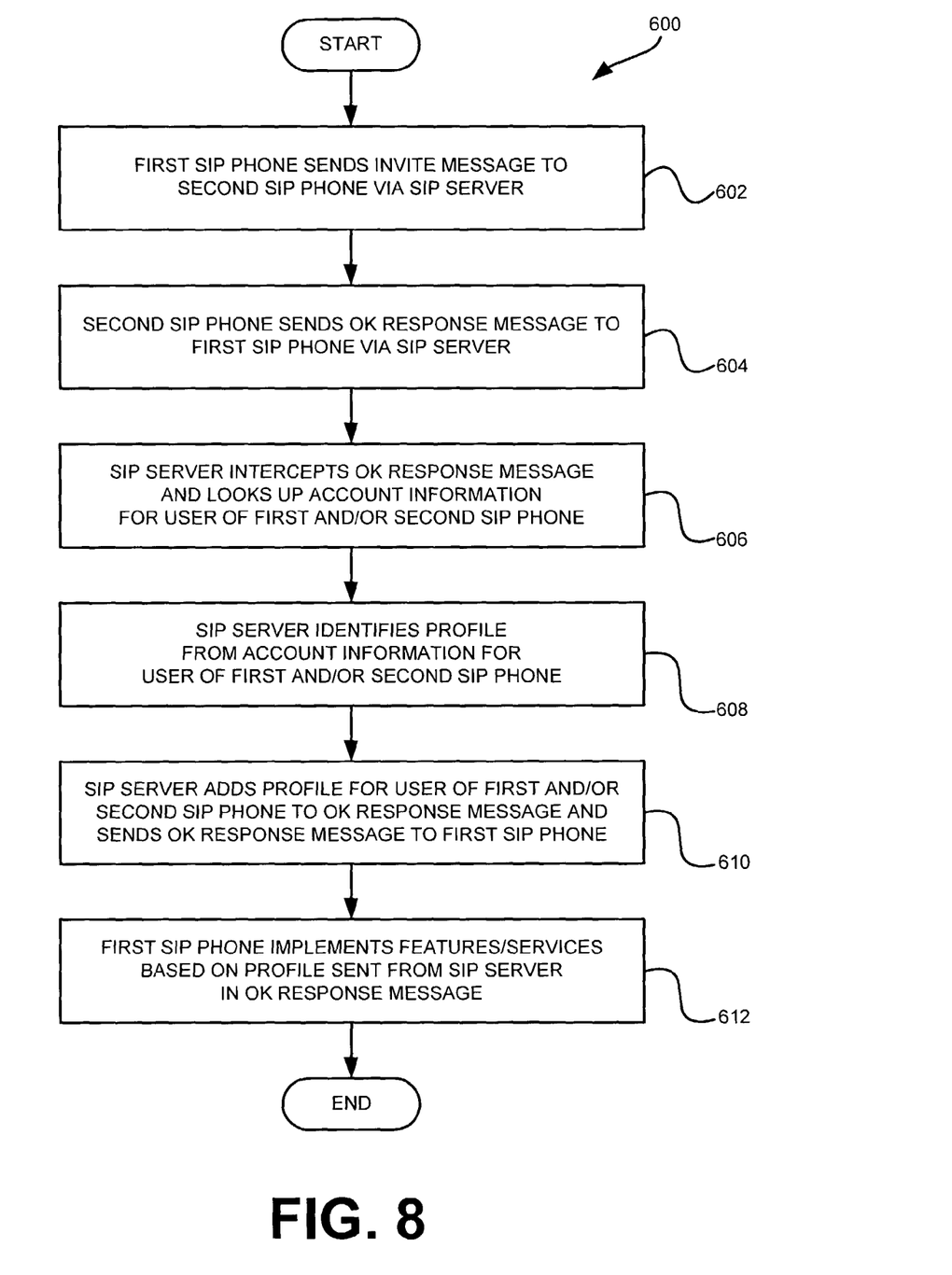
FIG. 8 is a flow diagram illustrating control via a response message of features and services used by an SIP phone.

Turning now to FIG. 8, the method 600 for controlling the features/services implemented by an SIP device begins with Step 602, wherein an SIP device (e.g., first SIP phone 32) sends a INVITE message to another SIP device (e.g., the second SIP phone 40) via the SIP server (e.g., SIP server 36). Table 5 illustrates an exemplary format for this INVITE message.

TABLE 5

INVITE sip:wherever.net SIP/2.0
To: br@wherever.net
From: sm@whatever.net
CSeq: 1 INVITE
Subject: initiating call As shown in Table 5, the first SIP phone (i.e., the caller) is identified by its e-mail address, which in this example is sm@whatever.net, and the second SIP phone (i.e., the callee) is identified by its e-mail address, which in this example is br@wherever.net. It should be understood that the INVITE message format shown in Table 5 is merely exemplary, and other formats may be used for the INVITE message of the present invention.

In Step 604, after receiving the INVITE message, the second SIP phone sends a response message to the first SIP phone via the SIP server. In Step 606, the SIP server intercepts the response message sent from the second SIP phone, and looks up the account information that is stored on the SIP server and corresponds to the user of the second SIP phone. In addition, or alternatively, the SIP server may look up, in Step 606, the account information that is stored on the SIP server and corresponds to the user of the first SIP phone.

Next, in Step 608, the SIP server examines the account information and identifies a profile for the first SIP phone from the account information corresponding to the user of the second SIP phone. Preferably, the profile includes information describing what features/services the user of the second SIP phone has subscribed to and/or canceled, and that may need to be implemented by the first SIP phone. For example, the profile information may indicate that a user or customer has subscribed to cancel call waiting, which may be implemented by the first SIP phone (in addition to the second SIP phone) to provide a call that is not disturbed by call waiting on either end.

The SIP server may also examine the account information and identify, in Step 608, a profile for the first SIP phone from the account information corresponding to the user of the first SIP phone. Preferably, the profile includes information describing what features/services the user of the first SIP phone has subscribed to and/or canceled. This profile information corresponding to the user of the first SIP phone may be combined with, or substituted for, the profile information corresponding to the user of the second SIP phone.

As shown in FIG. 8, the method 600 continues with Step 610, wherein the SIP server adds the profile information for the user of the second SIP phone to the response message, and sends the response message with the profile information to the first SIP phone. As mentioned above, the profile information contained within the response message may also include profile information for the user of the first SIP phone, or alternatively, may only include profile information for the user of the first SIP phone. As also mentioned above, the profile information may be added to a single message, a plurality of messages with each message including all of the profile information, or a plurality of messages with each message including only a portion (preferably a different portion) of the profile information.

Table 6 illustrates an exemplary format for this response message containing the profile information.

TABLE 6

SIP/2.0 200 OK
To: sm@wherever.net
From: br@whatever.net
CSeq: 1 INVITE
X-multimedia-service-enabled: CW=yes, CCW=yes, CND=no As shown in Table 6, the profile is contained within the "X-multimedia-service-enabled" field, with enabled or subscribed features/services being indicated with a "yes" and disabled or canceled features/services being indicated with a "no." In this example, call waiting (CW) is enabled, cancel call waiting (CCW) is enabled, and caller number delivery (CND) is disabled (i.e., not subscribed to by the user). Again, it should be understood that the response message format shown in Table 6 is merely exemplary, and other formats may be used for the response message of the present invention.

After receiving the response message from the SIP server, the first SIP phone implements the features/services specified in the profile contained within the response message in step 612. Preferably, the first SIP phone implements only those features/services specified in the profile. More preferably, the first SIP phone only implements those features/services that are specified in the portion of the profile which pertains to the user of the second SIP phone for the duration of the communication between the first and second SIP phones. Referring back to FIG. 8, the first SIP phone then proceeds to communicate with the second SIP phone based on the profile, and the method 600 ends.

The exemplary systems and methods of the present invention provide many advantages that are readily apparent from the above detailed description. For example, these systems and methods allow a service/network provider to centrally control the implementation of features and services by a user irrespective of the capabilities of his or her end device/phone. As a result, with the present invention, the service/network provider is able to preserve a revenue stream for its value added features/services, even though an end device may be otherwise capable of performing such features/services on its own. Since only a simple modification of a message's packet header is necessary, the systems and methods of the present invention also provide the further advantage of being fully integrated into existing communication protocols and infrastructure.

In addition, when register response messages are used to pass along the user's feature/service profile from the network core device/server to the end device/phone, control of the user's features/services is established at the beginning on registration, and communication between two end devices/phones can therefore proceed directly between the two without going through the network core device/server. On the other hand, if such profile information is not passed along to the end device/phone during the registration process, the profile may still be sent to the end device/phone in an invite message, or alternatively, in a response to an invite message. Also, when sending profile information in an invite or invite response message, the present invention has the further advantage of being able to send profile information corresponding to the user of a first end device/phone (or profile information corresponding to the users of both the first end device/phone and a second end device/phone) to the second end device/phone for implementation.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer steps and/or elements may be used in the flow/block diagrams. While various elements of the exemplary embodiments described herein may be implemented in software, hardware or firmware implementations may alternatively be used in other embodiments, and vice-versa.

In addition, although only registration and invite messages, as well as their respective response messages, are specifically discussed herein, the systems and methods of the present invention may be applied to, and work equally well with, other types of messages, such as an SIP NOTIFY message. Indeed, any communication message (e.g., any SIP message) or group of messages sent from a network core device (e.g., an SIP server) may be used with the systems and methods of the present invention by adding a user's profile information to the header of the message or messages (as illustrated above with respect to the register, invite, and response messages).

The claims should not be read as limited to the described order or elements unless stated to that effect. Therefore, all embodiments that come within the scope and spirit of the following claims and equivalents thereto are claimed as the invention.

What is claimed is:

1. A method for controlling features and services in packet-based networks, the method comprising the steps of:
   identifying a profile from user account information stored on a network core device, wherein the network core device is a session initiation protocol server, the profile specifying which features and services may or may not be implemented by an end device;
   adding the profile to at least one message; and
   sending the at least one message from the network core device to the end device, said end device using said profile to implement or not implement said features and services, wherein said end device is a session initiation protocol phone.

2. The method of claim 1 further comprising the step of implementing on the end device only the features and services allowed to be implemented by the profile of the at least one message.

3. A method for controlling features and services in packet-based networks, the method comprising the steps of:
   sending a first message to a network core device from a first end device;
   identifying a profile from user account information stored on the network core device, the profile specifying which features and services may or may not be implemented by a second end device;
   adding the profile to a second message;
   sending the second message from the network core device to the second end device, said second end device using said profile to implement or not implement said features and services, wherein said second end device is a phone.

4. The method of claim 3 further comprising the steps of adding the profile to the first message to form the second message, and using a first invite message for the first message and a second invite message for the second message.

5. The method of claim 4 further comprising the step of using invite messages that contain information for inviting the second end device to communicate with the first end device.

6. The method of claim 3 further comprising the step of using an invite message for the first message and a response message for the second message.

7. The method of claim 3 further comprising the step of implementing on the second end device only the features and services allowed to be implemented by the profile of the second message.

8. The method of claim 3 further comprising the steps of using a profile based on account information for a user of the first end device, and implementing on the second end device only the features and services allowed to be implemented by the profile of the second message.

9. The method of claim 3 further comprising the steps of using a profile based on account information for a user of the second end device, and implementing on the second end device only the features and services allowed to be implemented by the profile of the second message.

10. The method of claim 3 further comprising the steps of using a profile based on account information for users of both the first and second end devices, and implementing on the second end device only the features and services allowed to be implemented by the profile of the second message.

11. A method for controlling features and services in packet-based networks using the session initiation protocol, the method comprising the steps of: sending a first message to a session initiation protocol server; identifying a profile from user account information stored on the session initiation protocol server, the profile specifying which features and services may or may not be implemented by a session initiation protocol phone; adding the profile to a second message; and sending the second message from the session initiation protocol server to the session initiation protocol phone, said session initiation protocol phone using said profile to implement or not implement said features and services.

12. The method of claim 11 further comprising the steps of using a register message for the first message and a response message for the second message, and using the session initiation protocol phone to send the register message to the session initiation protocol server.

13. The method of claim 11 further comprising the step of implementing on the session initiation protocol phone only the features and services allowed to be implemented by the profile of the second message.

14. The method of claim 11 further comprising the steps of using a profile based on account information for a user of the session initiation protocol phone, and implementing on the session initiation protocol phone only the features and services allowed to be implemented by the profile of the second message.

15. The method of claim 11 further comprising the steps of using a first session initiation protocol phone to send the first message to the session initiation protocol server, and a second session initiation protocol phone to receive the second message from the session initiation protocol server.

16. The method of claim 15 further comprising the steps of adding the profile to the first message to form the second message, and using a first invite message for the first message and a second invite message for the second message.

17. The method of claim 16 further comprising the step of using invite messages that contain information for inviting the second session initiation protocol phone to communicate with the first session initiation protocol phone.

18. The method of claim 15 further comprising the step of using an invite message for the first message and a response message for the second message.

19. The method of claim 15 further comprising the step of implementing on the second session initiation protocol phone only the features and services allowed to be implemented by the profile of the second message.

20. The method of claim 15 further comprising the steps of using a profile based on account information for a user of the first end session initiation protocol phone, and implementing on the second session initiation protocol phone only the features and services allowed to be implemented by the profile of the second message.

21. The method of claim 15 further comprising the steps of using a profile based on account information for a user of the second session initiation protocol phone, and implementing on the second session initiation protocol phone only the features and services allowed to be implemented by the profile of the second message.

22. The method of claim 15 further comprising the steps of using a profile based on account information for users of both the first and second session initiation protocol phones, and implementing on the second session initiation protocol phone only the features and services allowed to be implemented by the profile of the second message.

23. A system for controlling features and services in packet-based networks communications, the system comprising:
    an end device in communication with a network core device, wherein said end device is a session initiation protocol phone and wherein said network core device is a session initiation protocol server;
    a profile identified from user account information stored on the network core device, the profile specifying which features and services may or may not be implemented by the end device; and
    at least one message including the profile;
    wherein the at least one message is sent from the network core device to the end device, the end device implementing only the features and services allowed to be implemented by the profile of the at least one message.

24. A system for controlling features and services in packet-based networks communications, the system comprising:
    a first end device in communication with a network core device, wherein said first end device is a session initiation protocol phone;
    a second end device in communication with the network core device, the second end device also in communication with the first end device via the network core device, wherein said second end device is a session initiation protocol phone;
    a profile identified from user account information stored on the network core device, the profile specifying which features and services may or may not be implemented by the second end device, wherein said network core device is a session initiation protocol server; and
    a first message and a second message, the second message including the profile;
    wherein the first message is sent from the first end device to the network core device, the second message is sent from the network core device to the second end device, and the second end device receiving the second message implements only the features and services allowed to be implemented by the profile of the second message.

25. The system of claim 24 wherein the first message is a registration message and the second message is a response message.

26. The system of claim 24 wherein the first message is an invite message and the second message is one of a further invite message or a response message.

* * * * *